N. HASLEY.
REVERSE GEAR.
APPLICATION FILED JAN. 4, 1916.

1,195,009.

Patented Aug. 15, 1916.
2 SHEETS—SHEET 1.

Witness
Geo. Ackman Jr.

Inventor
Nathan Hasley
By Victor J. Evans
Attorney

N. HASLEY.
REVERSE GEAR.
APPLICATION FILED JAN. 4, 1916.

1,195,009.

Patented Aug. 15, 1916.
2 SHEETS—SHEET 2.

Witness
F. A. Ackman Jr.

Inventor
Nathan Hasley
By Victor J. Evans
Attorney

UNITED STATES PATENT OFFICE.

NATHAN HASLEY, OF NEWPORT, OHIO.

REVERSE-GEAR.

1,195,009.  Specification of Letters Patent. Patented Aug. 15, 1916.

Application filed January 4, 1916. Serial No. 70,276.

*To all whom it may concern:*

Be it known that I, NATHAN HASLEY, a citizen of the United States, residing at Newport, in the county of Washington and State of Ohio, have invented new and useful Improvements in Reverse-Gears, of which the following is a specification.

This invention relates to reverse gears, the object in view being to provide mechanism of a compact and reliable construction by means of which a drive shaft rotating continuously in the same direction may impart motion to a driven member such as a belt pulley either in the same direction and at the same speed or in a reverse direction at the same speed, the reverse gear of this invention being designed for use in connection with the engine and propeller shafts of motor boats as well as the engine shaft and drive shaft of a motor vehicle of any description, the reverse mechanism being useful in any connection where it is desirable to impart motion to a driven shaft in either direction.

With the above and other objects in view, the invention consists in the novel construction, combination and arrangement of parts, as herein described, illustrated and claimed.

Figure 1:
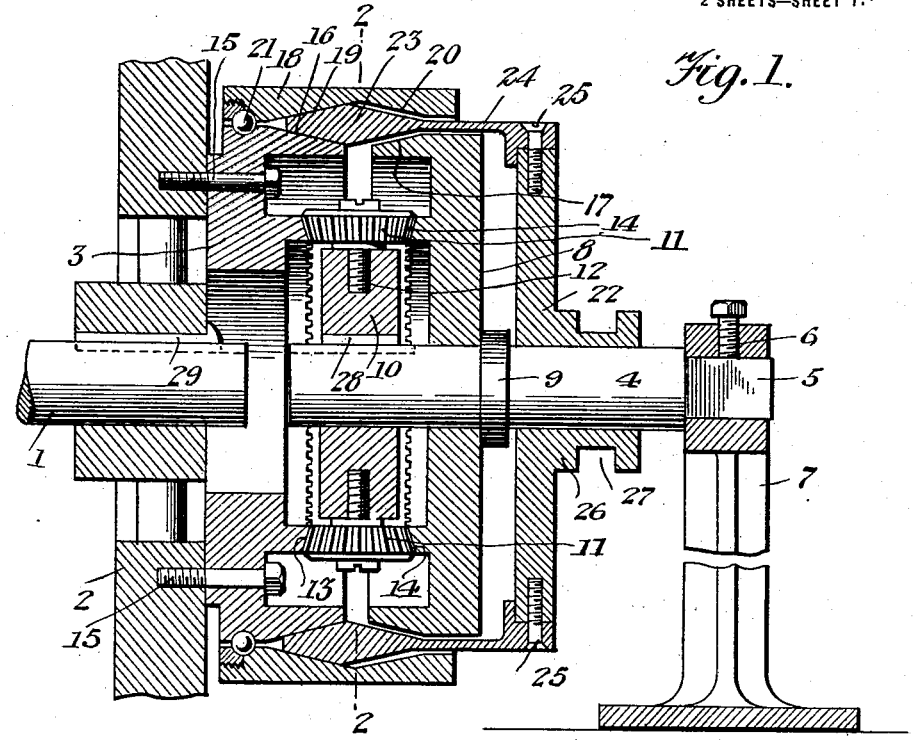
Figure 2:
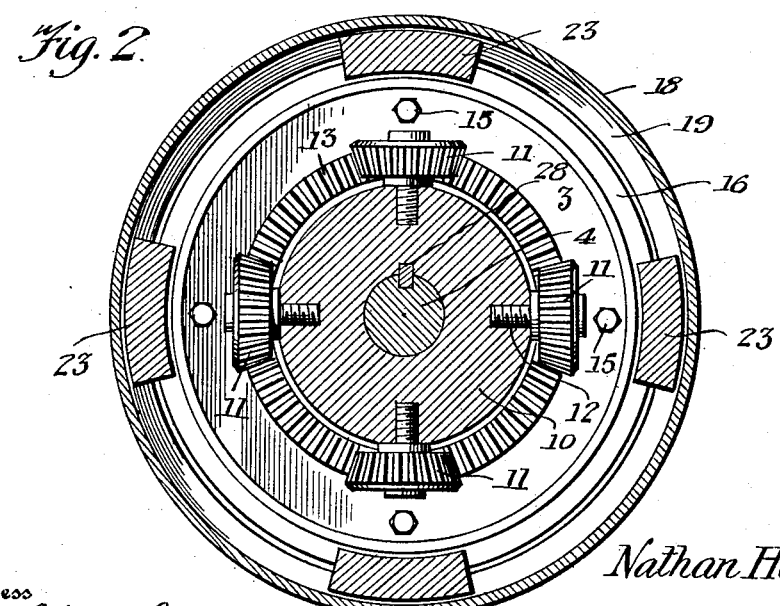
Figure 3:
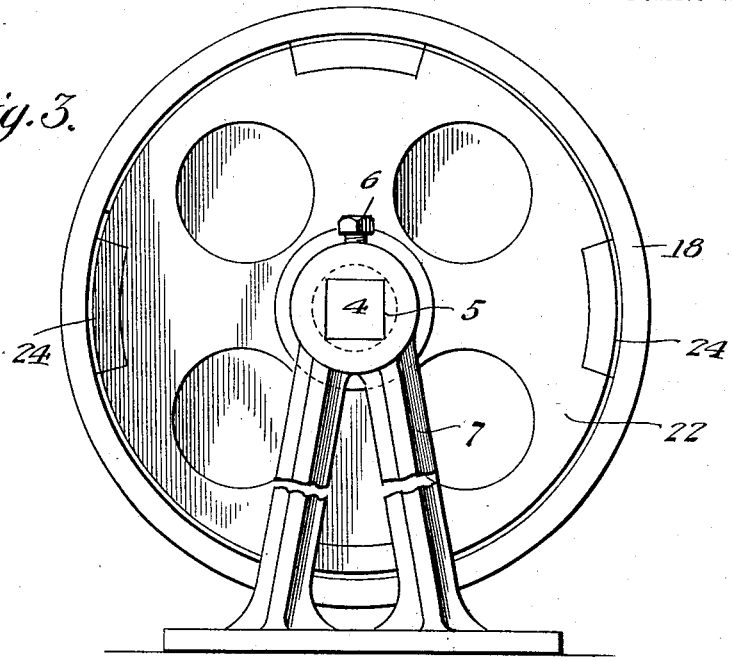
Figure 4:
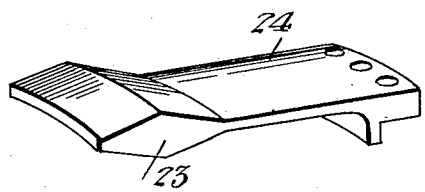

In the accompanying drawings:—Figure 1 is a diametrical section through the reverse gear taken in line with the driving shaft and the stationary shaft, the latter being shown in elevation. Fig. 2 is a cross section on the line 2—2 of Fig. 1. Fig. 3 is an end elevation of the reverse gear. Fig. 4 is a detail perspective view of one of the clutch members.

The driving shaft of the reverse gear is indicated at 1, the same being shown as having fast thereon a fly wheel 2 to which is fixedly attached a clutch faced driving gear 3.

4 designates a stationary shaft which is shown as having one end thereof reduced at 5 and held by means of a set screw 6 in a supporting upright 7. Mounted to turn loosely on the stationary shaft 4 is a clutch faced driven gear 8 which bears against a stop collar 9 on the shaft 4.

A pinion support 10 is fast on the shaft 4 and is therefore stationary. Pinions 11 have their shafts 12 journaled in bearings in the stationary pinion support 10 and all of said pinions mesh with the teeth 13 of the gear 3 and the teeth 14 of the gear 8, both of said gears and the pinions being in constant mesh. The gear 3 may be fastened to the fly wheel 2 in any manner as, for example, by means of screws or bolts 15.

The gear 3 is provided with a beveled friction clutch face 16 and the driven gear 8 is provided with a corresponding clutch face 17. Encircling the clutch faces 16 and 17 is a driven member 18 shown in the form of an endless rim or belt pulley adapted to receive the belt which transmits motion to the shaft (not shown) arranged parallel to the shaft 1, the shaft 1 ordinarily constituting the engine shaft. The driven member 18 is provided on its inner periphery with reversely inclined clutch faces 19 and 20 which respectively lie opposite the clutch faces 16 and 17 of the gears 3 and 8. The driven member 18 is supported in concentric relation to the shafts 1 and 4 by means of a bearing 21 shown as consisting of a circular series of anti-friction balls.

Mounted loosely and slidingly on the stationary shaft 4 is a clutch shifting member 22 which carries a circular series of clutch members 23 each shown in the form of a double wedge and provided with an arm 24 by means of which it is secured at 25 to the clutch shifting member 23. All of the clutch members 23 are thus attached to and simultaneously operable with and by means of the clutch shifting member 22, the latter being shown as provided with a hub 26 which is grooved at 27 to receive a shifting fork (not shown).

28 designates a key for fastening the pinion support 10 to the stationary shaft 4, and 29 represents a key for fastening the fly wheel 2 to the driving shaft 4.

From the foregoing description, taken in connection with the accompanying drawings, the operation of the reverse gear will now be understood to be as follows. The shaft 1 being constantly driven, the fly wheel 2 and the clutch faced driving gear 3 are also constantly driven at the same speed. When the clutch shifting member 22 is moved to the left in Fig. 1, the clutch members 23 wedge between the clutch faces 16 and 19 and thereby cause the gear 3 to take up and drive the driven member 18 in the same direction and at the same speed. In order to reverse the direction of rotation of the driven member 18, the clutch shifting member 22 is moved to the right in Fig. 1. This releases the connection between the gear 3 and the driven member 18 and connects the driven member 18 to the gear 8. The drive now takes place from the gear 3 through the pinions 11 to the gear 8, the latter being thus driven in the reverse direction from the gear 3 and as the driven member 18 is actuated in the same direction as the gear 8, said driven member 18 is of course driven in the opposite direction from the gear 3 and the shaft 1.

The construction hereinabove described is susceptible of changes in the form, proportion and minor details of construction which may accordingly be resorted to without departing from the principle or sacrificing any of the advantages of the invention.

Having thus described my invention, I claim:—

1. In reverse gear, the combination of a driving shaft, a stationary shaft, a driving gear fast on the driving shaft and embodying a clutch face, a driven gear loose on the stationary shaft and provided with a clutch face, a pinion support fast on the stationary shaft, bevel pinions on said support meshing with the aforesaid driving and driven gears, a driven member surrounding the clutch faces of said gears and provided with clutch faces, and a shiftable clutch member arranged to clutch the driven member to either the driving gear or the driven gear.

2. In reverse gear, the combination of a driving shaft, a stationary shaft, a driving gear fast on the driving shaft and embodying a clutch face, a driven gear loose on the stationary shaft and provided with a clutch face, a pinion support fast on the stationary shaft, bevel pinions on said support meshing with the aforesaid driving and driven gears, a driven member surrounding the clutch faces of said gears and provided with clutch faces, a plurality of clutch members arranged to clutch the driven member either to the driving gear or the driven gear, and a clutch shifting member for simultaneously operating said clutch members.

3. In reverse gear, the combination of a driving shaft, a stationary shaft, a driving gear fast on the driving shaft and embodying a clutch face, a driven gear loose on the stationary shaft and provided with a clutch face, a pinion support fast on the stationary shaft, bevel pinions on said support meshing with the aforesaid driving and driven gears, a driven member surrounding the clutch faces of said gears and provided with clutch faces, a plurality of clutch members arranged to clutch the driven member either to the driving gear or the driven gear, and a clutch shifting member for simultaneously operating said clutch members, said clutch shifting member being loose and slidable on the stationary shaft.

In testimony whereof I affix my signature in presence of two witnesses.

NATHAN HASLEY.

Witnesses:
R. R. WARREN,
IVAH L. EDDY.